United States Patent [19]

Thometschek et al.

[11] Patent Number: 5,213,380
[45] Date of Patent: May 25, 1993

[54] TESTING DEVICE FOR A PIVOTABLE DOOR OF AN EMERGENCY RESPIRATOR CONTAINER

[75] Inventors: Roderich Thometschek, Stockelsdorf; Christian Schnoor, Lübeck; Wolfgang Rittner, Bad Schwartau; Alfred Rother; Werner Thoren, both of Lübeck; Christoph Bauer, Ibbenbüren, all of Fed. Rep. of Germany

[73] Assignee: Drägerwerk AG, Lübeck, Fed. Rep. of Germany

[21] Appl. No.: 936,089

[22] Filed: Aug. 26, 1992

[30] Foreign Application Priority Data

Sep. 2, 1991 [DE] Fed. Rep. of Germany ........ 4129061

[51] Int. Cl.⁵ .............................................. E05C 5/02
[52] U.S. Cl. ......................................... 292/59; 292/262
[58] Field of Search ................... 292/59, 262, 278, 68, 292/DIG. 14, 62, 60, 58, 57

[56] References Cited

U.S. PATENT DOCUMENTS 3,299,678  1/1967  Spencer ........................... 292/251 X
4,570,992  2/1986  Furst et al. ........................ 292/278
4,688,835  8/1987  Wu .................................... 292/59
4,796,930  1/1989  Baynes ............................ 292/59 X

FOREIGN PATENT DOCUMENTS 0128142  12/1986  European Pat. Off. .

Primary Examiner—Richard E. Moore
Attorney, Agent, or Firm—McGlew and Tuttle

[57] ABSTRACT

A testing device (1) with a test button (4) and a rod-shaped plunger (5) for testing a locking device that can be actuated on a door (2) pivotable around a hinge on a container (3) is to be improved in terms of simple design and mounting. To simplify design and mounting, a fastening structure (8, 7) for the movable, rotatable mounting of the testing device (1) is arranged on the door (2). The end (13) of the plunger pointing toward the container (3) is provided with a holding structure (14) which is introduced into a mounting support (16) arranged permanently on the container (3) such that the holding structure (14) is out of engagement with the mounting support (16) in normal operation, and in testing operation. The holding structure engages the mounting support (16) in such a way as to limit the pivoting stroke of the door (2).

8 Claims, 2 Drawing Sheets

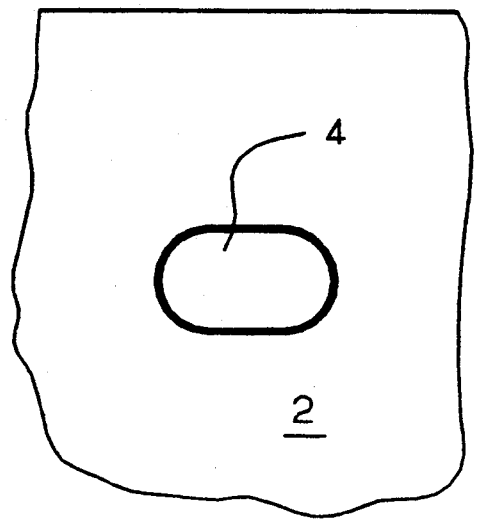
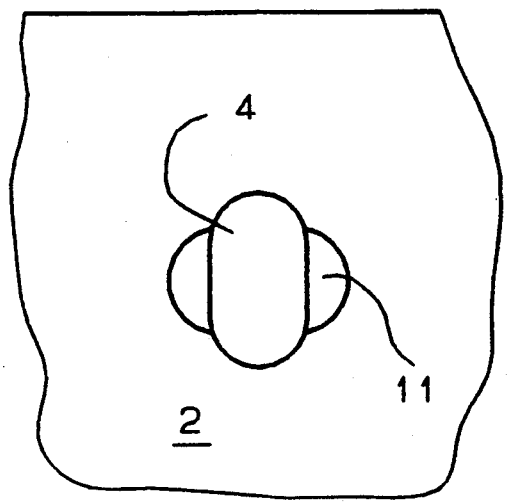
FIG 2
FIG 3
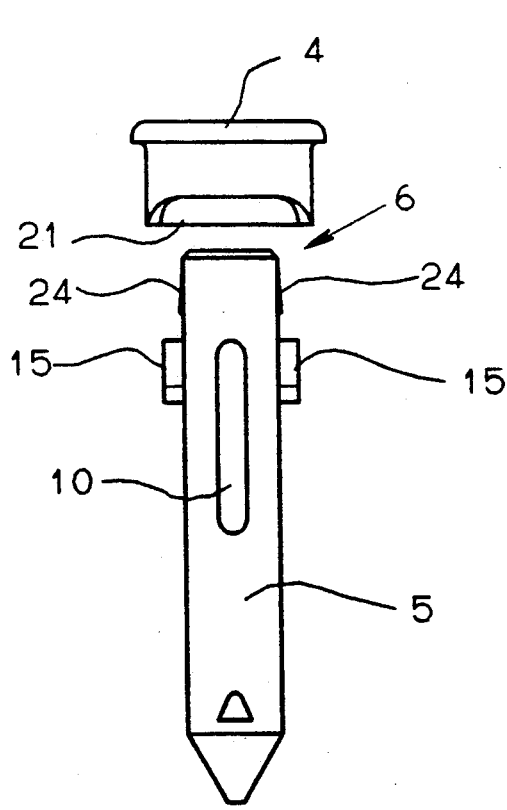
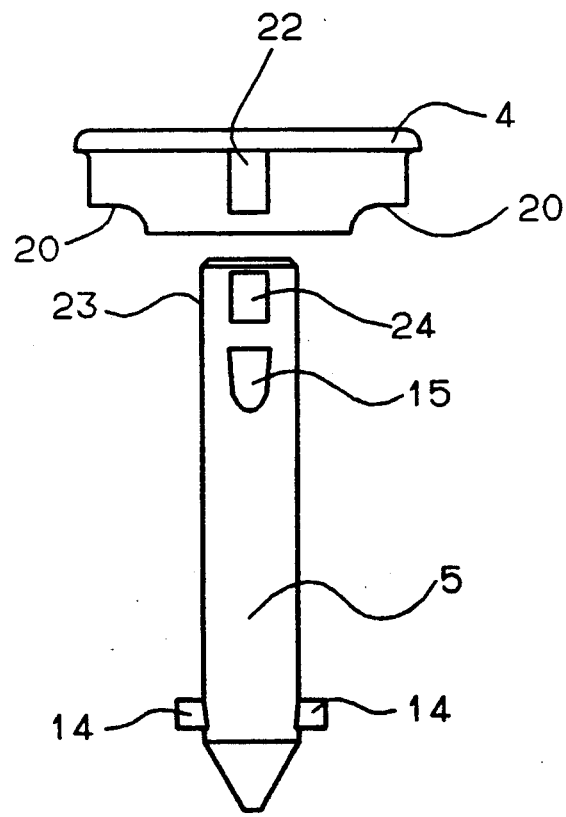
FIG 4
FIG 5

TESTING DEVICE FOR A PIVOTABLE DOOR OF AN EMERGENCY RESPIRATOR CONTAINER

FIELD OF THE INVENTION

The present invention pertains to a testing device with a test button and a rod-shaped plunger for testing a locking device that can be actuated on a door, then can be pivoted around a hinge of a container for an emergency respirator, wherein the test button is arranged in a cutout of the door in normal operation, but is pulled forward from the cutout together with the plunger and rotated during the test operation.

BACKGROUND OF THE INVENTION

A testing device of this type for the container of an emergency respirator has become known from EP-B1,128,142. The prior-art testing device consists of an oval test button with a cylindrical plunger made in one piece with it, which is guided in a supporting device connected to the container. The container is closed with a door and a locking device that can be actuated. In the place of the test button, the door has a corresponding oval cutout, through which the test button can be pulled forward to the outside. In normal operation, the test button is located within the cutout and is flush with the door. When the locking device is actuated, the door is released and is freely pivotable around a hinge located on the container. During test operation, the test button is first pulled forward and, rotated by 90°, it is brought into a testing position. The oval contour of the test button is now at right angles to that of the cutout. When the locking device is actuated, the pivoting stroke of the door is limited by the projecting test button rotated by 90°. Accessory equipment, e.g., emergency respirators, which may be located in the container, are thus retained, and the door can again be locked after being pressed onto the container.

It is disadvantageous that an expensive supporting device for the testing device is necessary on the container, and the test button must be adjusted, together with the supporting device, such that it will be flush with the cutout in the door in normal operation. This makes inexpensive manufacture difficult.

SUMMARY AND OBJECTS OF THE INVENTION

It is an object of the present invention to simplify the design of the testing device and the mounting of the testing device. Simplified design and mounting provide a structure which is more economical to manufacture and wherein the ability of the locking device to function (open the respirator container) may be checked while maintaining the contents in the respirator container and without an elaborate and expensive structure.

This object is attained in that the fastening means are arranged for the displaceable, rotatable mounting of the testing device on the door; that the cutout is provided with a pot-shaped depression for accommodating the testing device, with an opening for the plunger; and that the end of the plunger pointing toward the container has holding means which are introduced into a holding support securely attached to the container such that the holding means are out of engagement with the holding support in normal operation, and engage the holding support in testing operation in such a manner that they limit the pivoting stroke of the door.

The advantage of the present invention is essentially the fact that the testing device is attached directly in a pot-shaped depression on the door and an expensive supporting device on the container, which must be adjusted, together with the test button, to the oval cutout in the door, can thus be eliminated. The depression is part of the door and can be made directly in one piece with its flat surface, or it may be a separate molding, which is attached to the inside of the door. The holding means at the end of the plunger or the holding supports on the container are designed such that the holding means can be passed through the holding support without resistance during normal operation, i.e., in the normal position of the test button, and they engage the holding support and thus limit the pivoting stroke of the door during testing operation.

A suitable fastening means for the testing device is a compression spring in the plunger with a pin supported by the inside of the door, which pin is guided in slot-shaped pin guides on the plunger. When the position of the test button is changed from normal operation to testing operation, the testing device is pulled out by the test button against the force of the compression spring and, rotated by 90°, brought again into contact with the edge of the depression on the door. During this stroke movement of the plunger, the pin slides in the pin guides. To insert the compression spring, the plunger may have e.g., a continuous bore from its end, and the plunger is then again closed together with the compression spring inserted at the end of the plunger.

The holding means at the end of the plunger are preferably designed as projections, and the holding support is a molding arranged on the container, with a central bore for introducing the plunger, and with recesses shaped corresponding to the projections.

The test button is advantageously designed such that on its side facing the plunger, it has two opposite flattened areas, which are in positive-locking contact with the edge of the depression. The edge of the depression is the transition area between the cylindrical part of the depression and the flat surface of the door. Locking effect of the test button is thus achieved, because it occupies a defined position in relation to the depression, namely, 90°, during testing operation.

It is advantageous to provide the plunger—at right angles to the pin guides—with adjusting projections, which are arranged in the area of the opening. The adjusting projections are used for vertically positioning the testing device in the door, and they thus facilitate the introduction of the end of the plunger into the holding support on the container.

It is advantageous to design the test button and the plunger as plastic moldings which can be assembled at a coupling point. Inexpensive and material-saving production of the testing device is thus possible, because mechanical finishing is no longer necessary, and the pin guides, projections, and adjusting projections can be prepared directly at the time of injection molding. The plunger is designed directly as a hollow body, so that the compression spring only needs to be inserted.

The coupling point is preferably designed such that it has a cylindrical mounting on the test button, into which the plunger can be introduced in the preferred position in a self-locking manner. To do so, two lugs, which snap into correspondingly arranged windows on the cylindrical mounting of the test button, are arranged at the beginning of the plunger.

A further object of the invention is to provide a respiratory container door with a testing device which allows the door to be partially open, to test the locking device (the ability to open the container), which testing device is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 2 is a top view of a detail of the door with a test button in normal operation;

FIG. 3 is a top view of a detail of the door with a test button in testing operation;

FIG. 4 is a side view of a disassembled test button and plunger; and

FIG. 5 is a side view of a disassembled test button and plunger, rotated by 90° relative to FIG. 4, analogously to the view according to FIG. 1.

DETAILED DESCRIPTION OF THE PREFERRED EMBODIMENT

Figure 1:
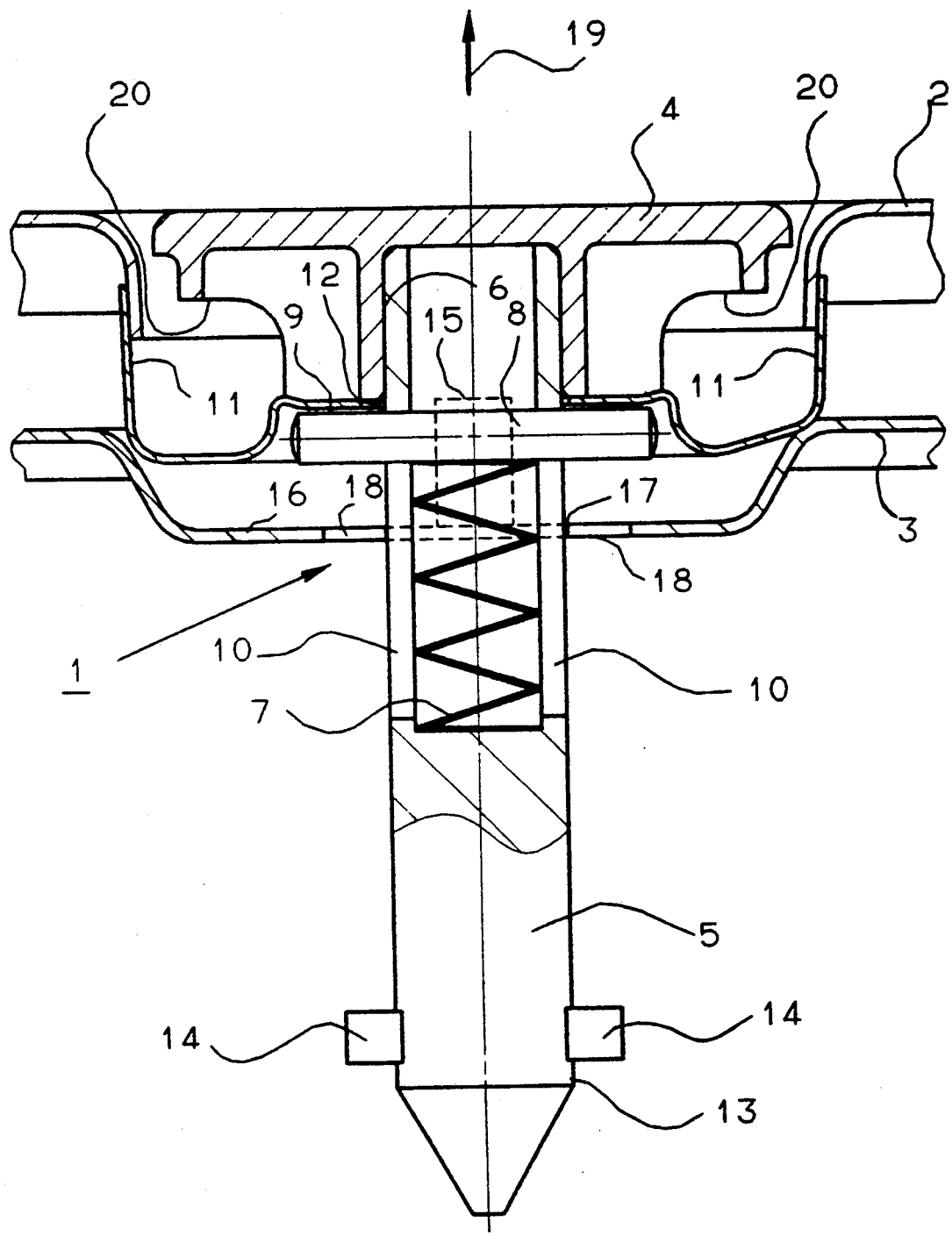
FIG. 1 is a longitudinal sectional view taken through a testing device mounted on the door of a container.

FIG. 1 shows the longitudinal section through a testing device 1, which is arranged on a door 2 of a container 3 of an emergency respirator system, not shown. Only the detail of the door 2 and of the container 3 showing the surroundings of the testing device 1 is shown. The locking device, with which the door 2 is held in the closed position, is not shown in the figures. It is usually located in the vicinity of the testing device. The testing device 1 consists of an oval test button 4 and a rod-shaped plunger 5, which are assembled in a coupling point 6. A compression spring 7, which is supported by a pin 8, is located inside the plunger 5, and the pin 8 is in contact with the inside 9 of a depression 11 in the door 2. In the area of the plunger 5, the pin is guided in two opposite pin guides. In the area of the test button 4, the door 2 is designed as an oval, pot-shaped depression 11 with an opening 12 for introducing the plunger 5. At its end 13, the plunger 5 has two opposite projections 14 and, in the area of the opening 12, the plunger 5 has two adjusting projections 15, only one of which is shown as a hiding contour (dashed line) in the sectional view represented in FIG. 1. In the area of the testing device 1, the container 3 is designed as a mounting support 16 with a bore 17 for the plunger 5 and with recesses 18 for the projections 14. In the position shown in FIG. 1, in the so-called normal operation, the test button 4 is within the depression 11 of the door 2, and the projections 14 are flush with the recesses 18 in the mounting support 16. When the door 2 is unlocked by the locking device (not shown), the projections can be passed through the recesses 18, and the door 2 can be opened.

FIG. 2 shows a detail of the door 2, viewed toward the test button 4 in normal operation. FIG. 2 shows a top view of the test button 4 according to FIG. 1.

FIG. 3 shows the test button 4 in testing operation in a representation equivalent to FIG. 2, but rotated by 90°.

To set the testing position, the test button 4 is pulled out in the direction of arrow 19 in FIG. 1, and is again placed on the door 2 after being rotated by 90°. To secure this position, the test button 4 has flattened areas 20, FIG. 1, which are in positive-locking contact with the edge of the depression 11. The edge of the depression 11 is the transition area between the cylindrical part of the depression 11 and the flat surface of the door 2. When the test button 4 is being pulled out, the pin 8, FIG. 1, slides within the pin guides 10, and the maximum stroke is limited by the length of the pin guides 10. In testing operation, the projections 14 are at right angles to the recesses 18 of the mounting support 16. If the door is unlocked during the testing operation, the pivoting movement is limited, because the projections 14 strike the mounting support 16.

On completion of the testing operation, the door 2 is again locked, and the test button 4 is returned to the so-called normal position. During the rotation of the test button 4, the adjusting projections 15 ensure vertical guidance of the plunger 5 within the opening 12.

FIGS. 4 and 5 illustrate the design of the test button 4 and that of the plunger 5 as plastic moldings. Identical components are designated by the same reference numerals as in FIG. 1. The view in FIG. 5 corresponds to the view of the sectional representation according to FIG. 1. The view in FIG. 4 is rotated by 90° in relation to that in FIG. 5.

The plunger 5 and the test button 4 according to FIGS. 4 and 5 are assembled at a coupling point 6, which consists of a cylindrical mounting 21 on the lower side of the test button 4 with two windows 22 and a tubular beginning section 23 of the plunger with two lugs 24. When the test button 4 and the plunger 5 are pushed together, the lugs snap into the windows 22, as a result of which there is a positive, unmistakable association between the test button 4 and the plunger 5, i.e., between the oval contour of the test button 4 and the projections 14.

While a specific embodiment of the invention has been shown and described in detail to illustrate the application of the principles of the invention, it will be understood that the invention may be embodied otherwise without departing from such principles.

What is claimed is:

1. A container lock testing device, comprising: a container having a mounting support arranged permanently thereon; a door pivotable around a hinge on said container, said door including a cut-out with a pot-shaped depression, said pot-shaped depression having an opening; a test button with a rod-shaped plunger, said test button being positioned in said cut-out of said door in a normal operation state and being pulled out of said cut-out together with at least a portion of said plunger and rotated in a testing operation state; fastening means for displaceable, rotatable mounting of said testing device on said door; holding means provided at an end of said plunger opposite said test button, said holding means for engaging said mounting support in said testing operation state to limit the pivoting movement of said door and said holding means passing through said mounting support in said normal operation state.

2. A testing device according to claim 1, wherein said fastening means includes a compression spring positioned in said plunger and a pin supported on an inside of said door, said plunger including a lateral slot-shaped pin guide for allowing movement of said plunger relative to said pin over the dimension of said pin guide.

3. A testing device according to claim 1, wherein said holding means includes projections, said mounting support being formed as a molding located on said container defining a hole for passage of said plunger therethrough and including recesses adjacent said hole, said recesses being shaped corresponding to said projections for allowing said projections to pass through said recesses in said normal operating state.

4. A testing device according to claim 2, wherein said holding means includes projections, said mounting support being formed as a molding located on said container defining a hole for passage of said plunger therethrough and including recesses adjacent said hole, said recesses being shaped corresponding to said projections for allowing said projections to pass through said recesses in said normal operating state.

5. A testing device according to claim 1, wherein on a side of said test button facing said plunger, said test button includes two opposite flattened areas positionable in positive-locking contact with an edge of said depression in said testing operation state.

6. A testing device according to claim 3, wherein said plunger includes adjusting projections for vertical guiding at right angles to said pin guides, in an area of said hole.

7. A testing device according to claim 1, wherein said test button and said plunger are formed as plastic moldings assembled at a coupling point.

8. A testing device according to claim 7, wherein said coupling point comprises a cylindrical mounting on said test button into which a beginning section of said plunger is introduced in a preferred position in a self locking manner.

* * * * *